(12) United States Patent
Tashiro et al.

(10) Patent No.: US 12,163,872 B2
(45) Date of Patent: Dec. 10, 2024

(54) PARTICLE SORTING KIT

(71) Applicant: SONY GROUP CORPORATION, Tokyo (JP)

(72) Inventors: Shinji Tashiro, Tokyo (JP); Tatsumi Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 249 days.

(21) Appl. No.: 17/755,903

(22) PCT Filed: Nov. 13, 2020

(86) PCT No.: PCT/JP2020/042371
§ 371 (c)(1),
(2) Date: May 11, 2022

(87) PCT Pub. No.: WO2021/100620
PCT Pub. Date: May 27, 2021

(65) Prior Publication Data
US 2022/0381655 A1    Dec. 1, 2022

(30) Foreign Application Priority Data

Nov. 20, 2019   (JP) ................................. 2019-210039

(51) Int. Cl.
*G01N 1/00*   (2006.01)
*G01N 1/22*   (2006.01)

(52) U.S. Cl.
CPC .................................. *G01N 1/2205* (2013.01)

(58) Field of Classification Search
CPC .................................................. G01N 1/2205
See application file for complete search history.

(56) References Cited

U.S. PATENT DOCUMENTS

| 2009/0236226 A1* | 9/2009 | Yuen ....................... B01L 9/527 |
| | | 204/600 |
| 2012/0121484 A1* | 5/2012 | Kojima ................... B01L 9/527 |
| | | 422/547 |
| 2012/0236312 A1* | 9/2012 | Takashimizu ...... G01N 35/1095 |
| | | 356/440 |
| 2020/0011782 A1* | 1/2020 | Tashiro .............. G01N 15/0826 |

(Continued)

FOREIGN PATENT DOCUMENTS

| JP | 07-248284 A | 9/1995 |
| JP | 08-089720 A | 4/1996 |
| JP | 2011-519019 A | 6/2011 |

(Continued)

OTHER PUBLICATIONS

International Search Report and Written Opinion of PCT Application No. PCT/JP2020/042371, issued on Jan. 19, 2021, 11 pages of ISRWO.

*Primary Examiner* — Jamel E Williams
(74) *Attorney, Agent, or Firm* — CHIP LAW GROUP

(57) ABSTRACT

Provided is a particle sorting kit provided with a sample accommodation unit that accommodates a sample liquid containing particles, a microchip provided with a sample flow path through which the sample liquid flows and a sorting flow path in which target particles are sorted from the sample liquid, and a filter unit provided with a filter and a tapered portion that decreases a flow path diameter in a flow direction downstream of the filter.

9 Claims, 7 Drawing Sheets

(56) References Cited

U.S. PATENT DOCUMENTS

2020/0032184 A1* 1/2020 Tashiro ................ G01N 15/00

FOREIGN PATENT DOCUMENTS

| JP | 2012118039 A | * | 6/2012 | ........ B01L 3/502715 |
| JP | 2012198050 A | * | 10/2012 | ........ B01L 3/502715 |
| JP | 2017-058375 A | | 3/2017 | |
| JP | 2018132472 A | * | 8/2018 | ........ B01L 3/502761 |
| WO | 2018/163943 A1 | | 9/2018 | |
| WO | 2018/191534 A1 | | 10/2018 | |
| WO | WO-2018179647 A1 | * | 10/2018 | ......... G01N 15/0826 |

* cited by examiner

PARTICLE SORTING KIT

CROSS REFERENCE TO RELATED APPLICATIONS

This application is a U.S. National Phase of International Patent Application No. PCT/JP2020/042371 filed on Nov. 13, 2020, which claims priority benefit of Japanese Patent Application No. JP 2019-210039 filed in the Japan Patent Office on Nov. 20, 2019. Each of the above-referenced applications is hereby incorporated herein by reference in its entirety.

TECHNICAL FIELD

The present technology relates to a particle sorting kit used when sorting particles using a microchip provided with a microchannel.

BACKGROUND ART

Currently, a technology referred to as flow cytometry is used for analyzing microparticles such as cells and microorganisms. This flow cytometry is an analysis method for analyzing and sorting microparticles by irradiating the microparticles flowing so as to be included in a sheath flow fed into a flow path with light and detecting fluorescence and scattered light emitted from each microparticle. A device used for this flow cytometry is called as a flow cytometer.

In this flow cytometer, a microchip obtained by providing an area or a flow path for performing chemical or biological analysis on a substrate of silicon or glass is used. An analysis system using such microchip is referred to as a micro-total-analysis system (µ-TAS), a lab-on-chip, a biochip and the like.

As an example of application of µ-TAS to a microparticle measurement technology, there is a microparticle sorting device that optically, electrically, or magnetically measures characteristics of the microparticles to sort in the flow path or area arranged on the microchip. Such flow cytometer (microchip type flow cytometer) to which µ-TAS is applied has an advantage that cross contamination of samples between measurements and the like may be prevented by forming a flow path system using the microchip.

For example, Patent Document 1 discloses "A microchip provided with a main flow path through which a liquid containing microparticles flows, and a sorting flow path on which a capturing chamber into which the microparticles are captured and a pressure chamber in which a negative pressure is generated are arranged, the sorting flow path communicating with the main flow path, in which a cross section perpendicular to a flow direction of the liquid in the capturing chamber and the pressure chamber is formed to be larger than a cross section perpendicular to the flow direction of the liquid in another portion of the sorting flow path".

CITATION LIST

Patent Document

Patent Document 1: Japanese Patent Application Laid-Open No. 2017-058375

SUMMARY OF THE INVENTION

Problems to be Solved by the Invention

In order to analyze and sort microparticles such as cells and microorganisms, presence of foreign matters such as aggregates of particles and fiber waste in a sample liquid leads to a cause of deterioration in analysis accuracy and sorting accuracy. Therefore, they are desirably removed before being allowed to flow through a microchannel. Then, since the sample liquid allowed to flow through the microchannel has a small amount and a small flow rate, a filter used for removing the foreign matters needs to function even at a small flow rate with a small loss amount of particles.

However, since a general filter has a large dead volume and a large area, an amount of liquid remaining inside during use is large. Furthermore, there has been a problem that microparticles such as cells and microorganisms are deposited and stacked inside the filter due to a small flow rate.

Therefore, a principal object of the present technology is to provide a particle sorting kit provided with a filter that functions even at a small flow rate with a small loss amount of particles.

Solutions to Problems

The present technology first provides
a particle sorting kit provided with:
 a sample accommodation unit configured to accommodate a sample liquid containing particles;
 a microchip provided with a sample flow path through which the sample liquid flows and a sorting flow path in which target particles are sorted from the sample liquid; and
 a filter unit provided with a filter and a tapered portion that decreases a flow path diameter in a flow direction downstream of the filter. In the particle sorting kit according to the present technology, a taper angle of the tapered portion may be set to 50 to 80°.

In the particle sorting kit according to the present technology, the sample accommodation unit, the microchip, and the filter unit may be hermetically connected.

In the particle sorting kit according to the present technology, the filter unit may be provided upstream of the sample accommodation unit.

Furthermore, the filter unit may be provided between the sample accommodation unit and the microchip.

Moreover, the filter unit may be provided upstream of the sample accommodation unit and between the sample accommodation unit and the microchip.

In the particle sorting kit according to the present technology, a tube pump unit may be provided between the sample accommodation unit and the filter unit.

In the particle sorting kit according to the present technology, the filter unit may be provided with a fitting portion for fitting to an outer diameter of a tube for connection to the sample accommodation unit and/or the microchip.

The fitting portion may be designed to have a tapered structure in which a diameter decreases in a direction toward the filter.

In this case, a taper angle of the tapered structure of the fitting portion may be set to 80 to 90°.

In the present technology, "particles" may broadly include bio-related microparticles such as cells, microorganisms, and liposomes, synthetic particles such as latex particles, gel particles, and industrial particles and the like.

The bio-related microparticles include chromosomes forming various cells, liposomes, mitochondria, organelles (cell organelles) and the like. The cells include animal cells (for example, blood cells and the like) and plant cells. The microorganisms include bacteria such as *Escherichia coli*, viruses such as tobacco mosaic virus, fungi such as yeast and the like. Moreover, the bio-related microparticles also include bio-related polymers such as nucleic acids, proteins, and complexes thereof. Furthermore, the industrial particles may be, for example, an organic or inorganic polymer material, metal and the like. The organic polymer material includes polystyrene, styrene/divinylbenzene, polymethyl methacrylate and the like. The inorganic polymer material includes glass, silica, a magnetic material and the like. The metal includes gold colloid, aluminum and the like. In general, shapes of the microparticles are generally spherical, but in the present technology, they may be non-spherical, and its size, mass and the like are also not especially limited.

BRIEF DESCRIPTION OF DRAWINGS

FIG. 6A is the conceptual diagram illustrating a state of the filter unit 13 and the tube 15 before connection, and FIG. 6B is the conceptual diagram illustrating a state in which the filter unit 13 is connected to the tube 15.

MODE FOR CARRYING OUT THE INVENTION

Figure 1:
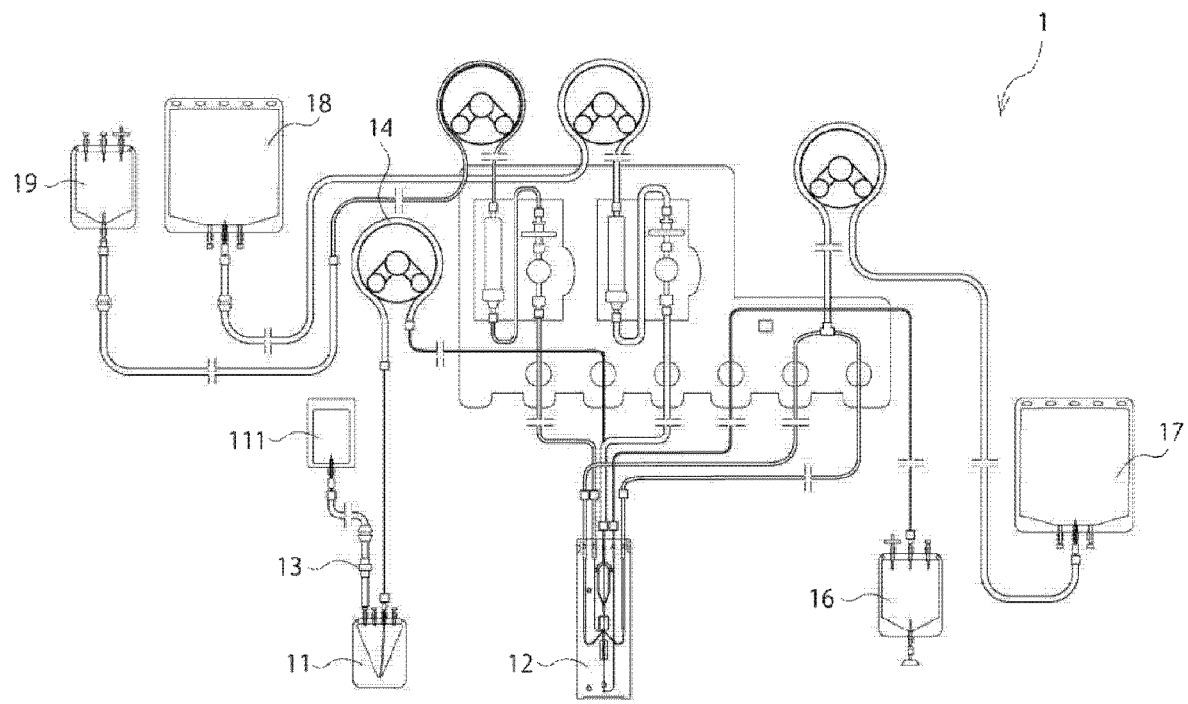
FIG. 1 is a conceptual diagram schematically illustrating a first embodiment of a particle sorting kit 1 according to the present technology.

Hereinafter, a preferred mode for carrying out the present technology is described with reference to the drawings.

An embodiment hereinafter described illustrates an example of a representative embodiment of the present technology, and the scope of the present technology is not narrowed by this. Note that, the description is given in the following order.

1. Particle sorting kit 1
  (1) Sample accommodation unit 11
  (2) Microchip 12
  (3) Filter unit 13
  (4) Tube pump unit 14
  (5) Target particle storage unit 16
  (6) Disposal unit 17
  (7) Sheath liquid accommodation unit 18
  (8) Gate liquid accommodation unit 19
2. Particle sorting device 2 and particle sorting system 3
  (1) Particle sorting kit 1
  (2) Light irradiation unit 21
  (3) Light detection unit 22
  (4) Information processing unit 23
  (5) Storage unit 24
  (6) Display unit 25
  (7) User interface 26

1. Particle Sorting Kit 1

FIG. 1 is a conceptual diagram schematically illustrating a first embodiment of a particle sorting kit 1 according to the present technology. The particle sorting kit 1 according to the present technology is at least provided with a sample accommodation unit 11, a microchip 12, and a filter unit 13. Furthermore, a tube pump unit 14, a target particle storage unit 16, a disposal unit 17, a sheath liquid accommodation unit 18, a gate liquid accommodation unit 19 and the like may also be provided as necessary. Hereinafter, the particle sorting kit 1 is described in detail.

(1) Sample Accommodation Unit 11

The sample accommodation unit 11 accommodates a sample liquid containing particles to be sorted. The sample accommodation unit 11 may include, for example, a cylindrical cylinder body with one end opened and a lid fitted to the cylinder body to close the opening. Then, a plurality of opening valves for accommodating the sample liquid in the cylinder body is formed on the lid, and each opening valve employs a configuration of a check valve. Therefore, in a state in which the sample liquid is accommodated in the sample accommodation unit 11 via the opening valves, the sample liquid does not go out of the sample accommodation unit 11. Furthermore, the sample liquid is sealed against an external atmosphere by the configuration of the opening valves.

The sample liquid is not especially limited as long as this is a sample containing target particles sorted using the particle sorting kit 1 according to the present technology. Specifically, for example, there may be a liquid containing patient-derived cells and the like such as whole blood and a cell suspension containing only peripheral blood mononuclear cells and lymphocytes contained in whole blood.

The sample accommodation unit 11 may also include a substance that suppresses aggregation of particles in the sample liquid. By using the substance that suppresses aggregation of particles in the sample liquid, it is possible to suppress the aggregation of the particles in the sample liquid and remove an aggregate that still occurs by the filter unit 13 to be described later, so that impurities in the sample liquid may be more reliably removed.

Examples of the substance that suppresses aggregation of particles include deoxyribonuclease (DNase), ethylenediaminetetraacetic acid (EDTA), poloxamer (for example, "Pluronic F68" manufactured by BASF SE and the like) and the like.

In a case where the substance that suppresses aggregation of particles is included, a commonly used solution may be used as the solution used as the sample liquid as long as an effect of the present technology is not impaired, but in the present technology, phosphate buffered saline (PBS) is preferably used.

In a case where PBS is used, PBS not containing calcium ions and magnesium ions is preferable, but in a case where a substance that suppresses the aggregation of the particles described above is used, it is also possible to use PBS containing calcium ions and magnesium ions depending on a type of the substance to be used. Specifically, in the present technology, it is preferable to use a combination of PBS (without $Ca^{2+}$, $Mg^{2+}$), PBS (with $Ca^{2+}$, $Mg^{2+}$)+DNase, PBS (without $Ca^{2+}$, $Mg^{2+}$)+EDTA and the like, and it is also possible to add poloxamer to the combination. Furthermore, albumin such as bovine serum albumin and human serum albumin may be added at a concentration of, for example, about 0.5%.

Note that, in the particle sorting kit 1 according to the present technology, it is also possible to provide a pre-sample accommodation unit 111 upstream of the sample accommodation unit 11, and provide the substance that suppresses aggregation of particles in the sample liquid, other chemicals and the like in the pre-sample accommodation unit 111.

(2) Microchip 12

Figure 2:
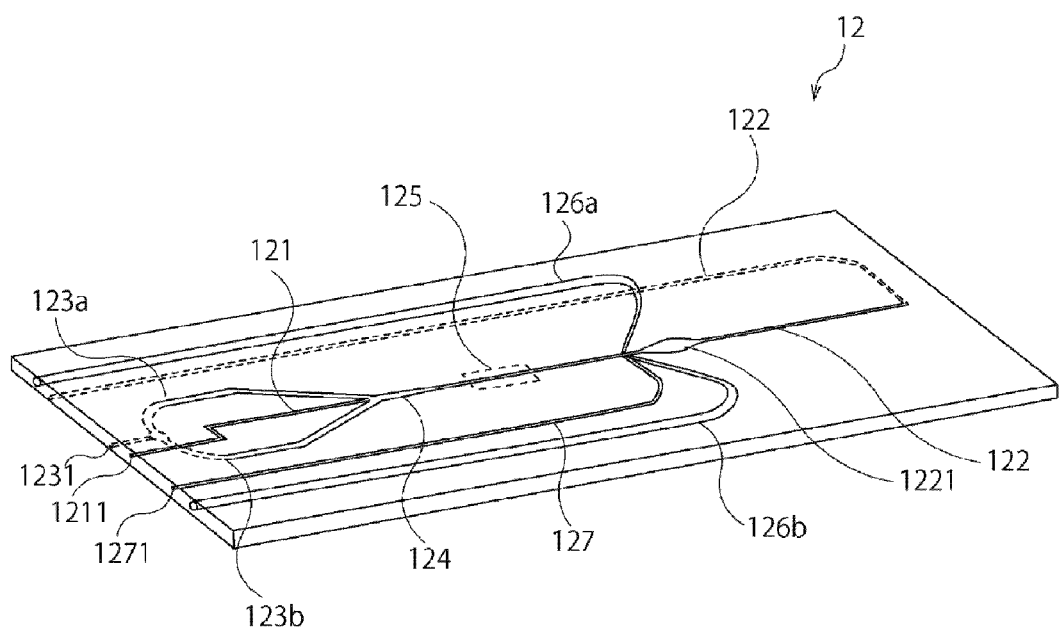
FIG. 2 is an enlarged conceptual diagram schematically illustrating an example of an embodiment of a microchip 12 that may be used in the particle sorting kit 1 according to the present technology.

FIG. 2 is an enlarged conceptual diagram schematically illustrating an example of an embodiment of the microchip 12 that may be used in the particle sorting kit 1 according to the present technology. The microchip 12 that may be used in the present technology is at least provided with a sample flow path 121 through which the sample liquid flows, and a sorting flow path 122 in which the target particles are sorted from the sample liquid.

The sample liquid containing the particles is introduced from a sample inlet 1211 into the sample flow path 121. Furthermore, a sheath liquid introduced from a sheath inlet 1231 is divided into two sheath flow paths 123*a* and 123*b* and fed. The sample flow path 121 and the sheath flow paths 123*a* and 123*b* merge to form a main flow path 124. A sample liquid laminar flow fed through the sample flow path 121 and sheath liquid laminar flows fed through the sheath liquid paths 123*a* and 123*b* may merge in the main flow path 124 to form a sheath flow in which the sample liquid laminar flow is sandwiched between the sheath liquid laminar flows.

Reference numeral 125 in FIG. 2 denotes a detection area irradiated with excitation light by a light irradiation unit 21 to be described later in which fluorescence and scattered light are detected by a light detection unit 22 to be described later. The particles are fed to the detection area 125 in a state of being arranged in a line in the sheath flow formed in the main flow path 124, and are irradiated with the excitation light from the light irradiation unit 21.

The main flow path 124 branches into three flow paths downstream of the detection area 125. The main flow path 124 communicates with three branch flow paths of the sorting flow path 122 and disposal flow paths 126*a* and 126*b* downstream of the detection area 125. Among them, the sorting flow path 122 is a flow path to which particles determined to satisfy a predetermined optical characteristic (also referred to as "target particles") are taken in. In contrast, particles determined not to satisfy the predetermined optical characteristic (also referred to as "non-target particles") are not taken into the sorting flow path 122 and flow to any one of the two disposal flow paths 126*a* and 126*b*.

The target particles are taken into the sorting flow path 122 by generating a negative pressure in the sorting flow path 122 by a piezoelectric element such as a piezo element and sucking the sample liquid containing the target particles and the sheath liquid into the sorting flow path 122 using the negative pressure. The piezoelectric element is arranged so as to be in contact with a surface of the microchip 12 and is arranged at a position corresponding to the sorting flow path 122. More specifically, the piezoelectric element is arranged at a position corresponding to a pressure chamber 1221 provided as an area in which an inner space is expanded in the sorting flow path 122.

As illustrated in FIG. 2, the inner space of the pressure chamber 1221 is expanded in a planar direction (width direction of the sorting flow path 122) and also expanded in a cross-sectional direction (height direction of the sorting flow path 122). That is, the sorting flow path 122 is expanded in the width direction and the height direction in the pressure chamber 1221. In other words, the sorting flow path 122 is formed so that a cross section perpendicular to a flow direction of the sample liquid and the sheath liquid becomes large in the pressure chamber 1221.

The piezoelectric element generates an expansion/contraction force along with a change in applied voltage, and causes a pressure change in the sorting flow path 122 via the surface (contact surface) of the microchip 12. When a flow occurs in the sorting flow path 122 along with the pressure change in the sorting flow path 122, a volume in the sorting flow path 122 changes at the same time. The volume in the sorting flow path 122 changes until reaching a volume defined by a displacement amount of the piezoelectric element corresponding to the applied voltage. More specifically, the piezoelectric element presses a displacement plate forming the pressure chamber 1221 to keep the volume of the pressure chamber 1221 small in a state of being expanded with the applied voltage. Then, when the applied voltage decreases, the piezoelectric element generates a force in a contracting direction, and weakens a pressing force on the displacement plate to generate the negative pressure in the pressure chamber 1221.

In the present technology, in order to efficiently transmit the expansion/contraction force of the piezoelectric element into the pressure chamber 1221, it is preferable that the surface of the microchip 12 is concaved at a position corresponding to the pressure chamber 1221, and the piezoelectric element is arranged in the concave. Therefore, the displacement plate serving as the contact surface of the piezoelectric element may be thinned, so that the displacement plate may be easily displaced by a change in pressing force accompanying expansion/contraction of the piezoelectric element to cause a volume change of the pressure chamber 1221.

The microchip 12 is obtained by bonding substrate layers on which the sample flow path 121, the sorting flow path 122 and the like are formed. The sample flow path 121, the sorting flow path 122 and the like may be formed on the substrate layers by injection molding of a thermoplastic resin using a mold. As the thermoplastic resin, plastics conventionally known as materials of microchips such as polycarbonate, polymethyl methacrylate resin (PMMA), cyclic polyolefin, polyethylene, polystyrene, polypropylene, and polydimethylsiloxane (PDMS) may be employed. Note that, the number of substrate layers forming the microchip 12 is not especially limited, and may be, for example, a plurality of (two or more) layers.

The microchip 12 used in the present technology may further be provided with a gate liquid inlet 1271 from which a gate liquid is introduced, and a gate flow path 127 through which the gate liquid introduced from the gate liquid inlet 1271 flows. The gate flow path 127 is provided, for example, so as to be connected to one or more of the sorting flow path 122 from the three branching flow paths of the sorting flow path 122 and the disposal flow paths 126a and 126b to the front of the pressure chamber 1221, or is provided, for example, so as to perpendicularly intersect therewith. The "gate liquid" is the liquid allowed to flow to the gate flow path 127 and this serves as a main solvent of the sample such as microparticles recovered after sorting, so that various liquids may be selected according to the application. For example, in a case where a liquid medium to be used for a particle-containing liquid, the sheath liquid, and the particles are protein, a liquid according to the particles, such as a buffer liquid in which pH and the like is adjusted containing a surfactant may be allowed to flow at a constant flow rate.

Especially, in a case where the particles are cells, a cell culture solution, a cell preservative solution and the like may be used as the gate liquid. In a case where the cell culture solution is used, this is suitable in a case of performing a next step performed on the cells recovered after sorting, for example, steps such as cell culture, cell activation, and gene introduction. In a case where the cell preservative solution is used, this is suitable in a case of storing and transporting the recovered cells. Furthermore, in a case where the sorted and recovered cells are undifferentiated cells such as iPS cells, a differentiation inducing solution may be used, and a next operation may be efficiently performed.

Note that, various liquids may be similarly selected as the sheath liquid. In this specification, a flow formed by the gate liquid is referred to as a "gate flow".

An upstream side of the gate flow path 127 may be independently introduced from the gate flow inlet 1271 and allowed to flow at an appropriate flow rate. In the present technology, since a flow rate of the liquid introduced into the gate flow path 127 is smaller than a flow rate of the liquid introduced into the sheath flow paths 123a and 123b, it is economical in a case of using an expensive liquid such as the cell culture solution, the cell preservative solution, or the differentiation inducing solution only for the gate flow path 127.

Furthermore, the gate flow may be generated so as to be branched from the sheath liquid flow. For example, the sheath flow paths 123a and 123b after the sheath liquid inlet may be connected to an upstream end of the gate flow path 127 so that the sheath liquid flow may be branched to flow into the gate flow path 127, too, to form the gate flow. At that time, it is necessary to appropriately design a flow path resistance of the gate flow path 127 so that the gate flow rate becomes the appropriate flow rate.

At a site where the gate flow path 127 and the sorting flow path 122 intersect with each other, together with a gate flow directed straight in the gate flow path 127, gate flows directed toward the detection area 125 side and the pressure chamber 1221 side are also generated. The latter gate flow may prevent particles (non-target particles) that should not be acquired from entering the pressure chamber 1221 side of the sorting flow path 122. The gate flow that flows through the gate flow path 127 flows out to the sorting flow path 122 and branches into the gate flows directed toward the detection area 125 side and the pressure chamber 1221 side of the sorting flow path 122. The former gate flow may prevent the non-target particles from entering the pressure chamber 1221 side of the sorting flow path 122.

The microchip 12 according to the present technology to which the sample accommodation unit 11, the filter unit 13 to be described later and the like are connected is sometimes distributed as a part of an article such as a cartridge, a unit, a device, a kit, and an instrument for a closed cell sorter.

(3) Filter Unit 13

Figure 3:
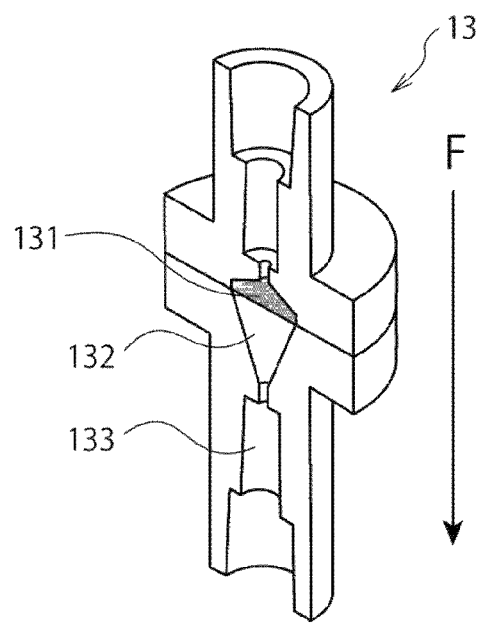
FIG. 3 is an enlarged perspective cross-sectional view schematically illustrating an example of an embodiment of a filter unit 13 used in the particle sorting kit 1 according to the present technology.

FIG. 3 is an enlarged perspective cross-sectional view schematically illustrating an example of an embodiment of the filter unit 13 used in the particle sorting kit 1 according to the present technology. The filter unit 13 is at least provided with a filter 131 and a tapered portion 132. Furthermore, a fitting portion 133 may also be provided as necessary.

(3-1) Filter 131

A material, an inner diameter, a pore diameter and the like of the filter 131 that may be used for the filter unit 13 of the particle sorting kit 1 according to the present technology may be designed according to a size and a form of the target particles to be sorted.

As a material of the filter 131 used in the present technology, nylon, polyethylene terephthalate (PET), polyethylene (PE) and the like may be used. Among them, in the present technology, it is preferable to manufacture the filter using nylon from the viewpoint of the pore diameter, sterilization, and adhesiveness.

Furthermore, the inner diameter of the filter 131 used in the present technology is preferably set to 0.5 to 10 mm, and more preferably set to 2 to 7 mm. As an area of the filter 131 is smaller, a loss amount of the target particles may be made smaller.

Moreover, the pore diameter of the filter 131 used in the present technology may be designed according to a type of the target particles. For example, in a case where the target particles are blood cells, this is preferably set to 20 to 100 µm. Furthermore, in a case where the target particles are iPS cells and the like, this may be set to 100 µm or larger. As described above, by designing the pore diameter of the filter 131 according to the type of the target particles, it is possible to efficiently remove impurities while preventing damage or death.

Figure 4:
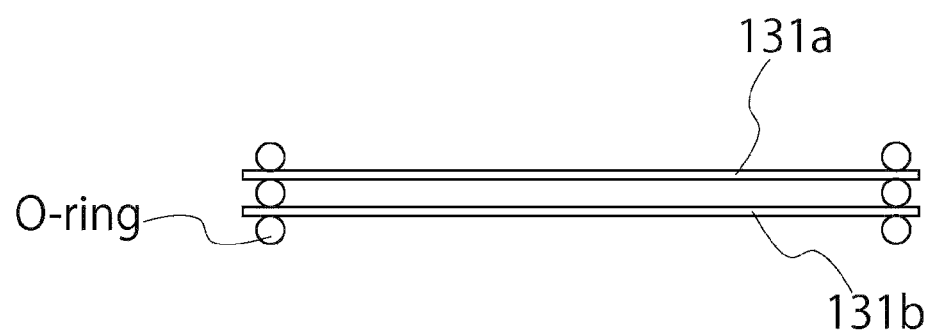
FIG. 4 is an enlarged cross-sectional view schematically illustrating an example of a stacking method of filters 131 used in the present technology.

Note that, a plurality of filters 131 may be stacked to be used. By staking two or more filters 131 to use, it is possible to more reliably prevent an outflow of aggregates of particles and foreign matters. In a case where a plurality of filters 131 is stacked, the filters may be stacked directly, but as illustrated in FIG. 4, filters 131a and 131b may be stacked via O-rings.

(3-2) Tapered Portion 132

The filter unit 13 of the particle sorting kit 1 according to the present technology is provided with the tapered portion 132 downstream of the filter 131. The tapered portion 132 has a form of decreasing a flow path diameter in a flow direction F of the sample liquid.

Figure 12:
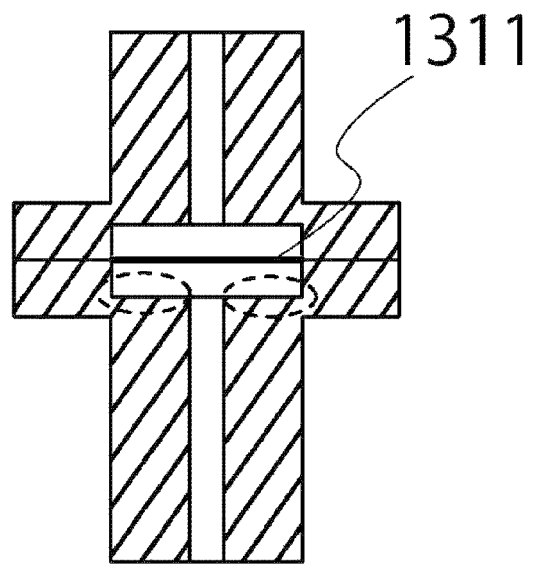
FIG. 12 is a cross-sectional view of a conventionally generally used filter structure.

FIG. 12 is a cross-sectional view of a conventionally generally used filter structure. In the conventional filter structure, particles in a sample liquid that passes through a filter 1311 settle in a portion indicated by a broken line in FIG. 12, and a loss amount of the particles has been a problem.

In contrast, since the filter unit 13 of the particle sorting kit 1 according to the present technology is provided with the tapered portion 132 downstream of the filter 131, it is possible to prevent the particles in the sample liquid that passes through the filter 131 from settling on an inner wall surface of the filter unit 13 and to reduce the loss amount of the particles.

Figure 5:
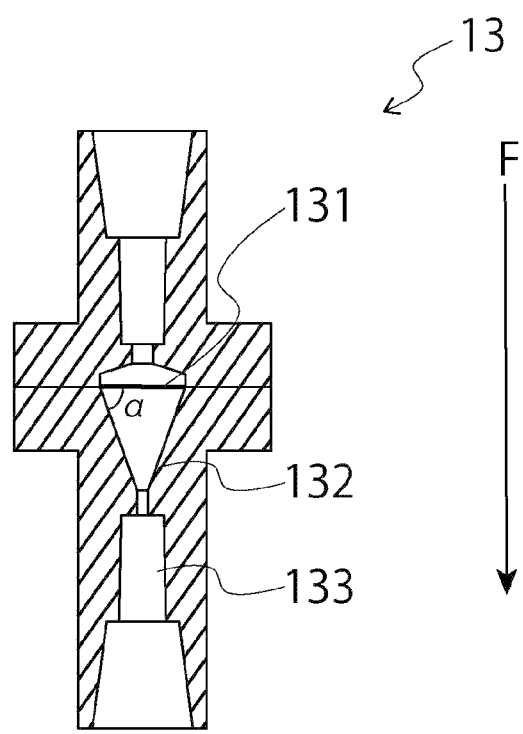
FIG. 5 is an enlarged cross-sectional view schematically illustrating an example of the embodiment of the filter unit 13 used in the particle sorting kit 1 according to the present technology.

FIG. 5 is an enlarged cross-sectional view schematically illustrating an example of the embodiment of the filter unit 13 used in the particle sorting kit 1 according to the present technology. In the particle sorting kit 1 according to the present technology, a taper angle α of the tapered portion 132 illustrated in FIG. 5 is preferably set to 50 to 80°. By setting the taper angle α of the tapered portion 132 to 50° or larger, it is possible to more advantageously prevent the particles in the sample liquid that passes through the filter 131 from settling on the inner wall surface of the filter unit 13. Furthermore, by setting the taper angle α of the tapered portion 132 to 80° or smaller, downsizing of the filter unit 13 may be implemented.

(3-3) Fitting Portion 133

The filter unit 13 of the particle sorting kit 1 according to the present technology may be provided with the fitting portion 133 for fitting to an outer diameter of a tube 15 for connection to the sample accommodation unit 11 and/or the microchip 12. Since the tube 15 used in the present technology has a very small inner diameter, tube connection using a barb shape as with a general tube cannot be performed. Therefore, by providing the fitting portion 133 that presses the tube 15 from the outer diameter and fits to the outer diameter on the filter unit 13 used in the present technology, this may also be connected to the tube 15 having a small inner diameter.

Figure 6:
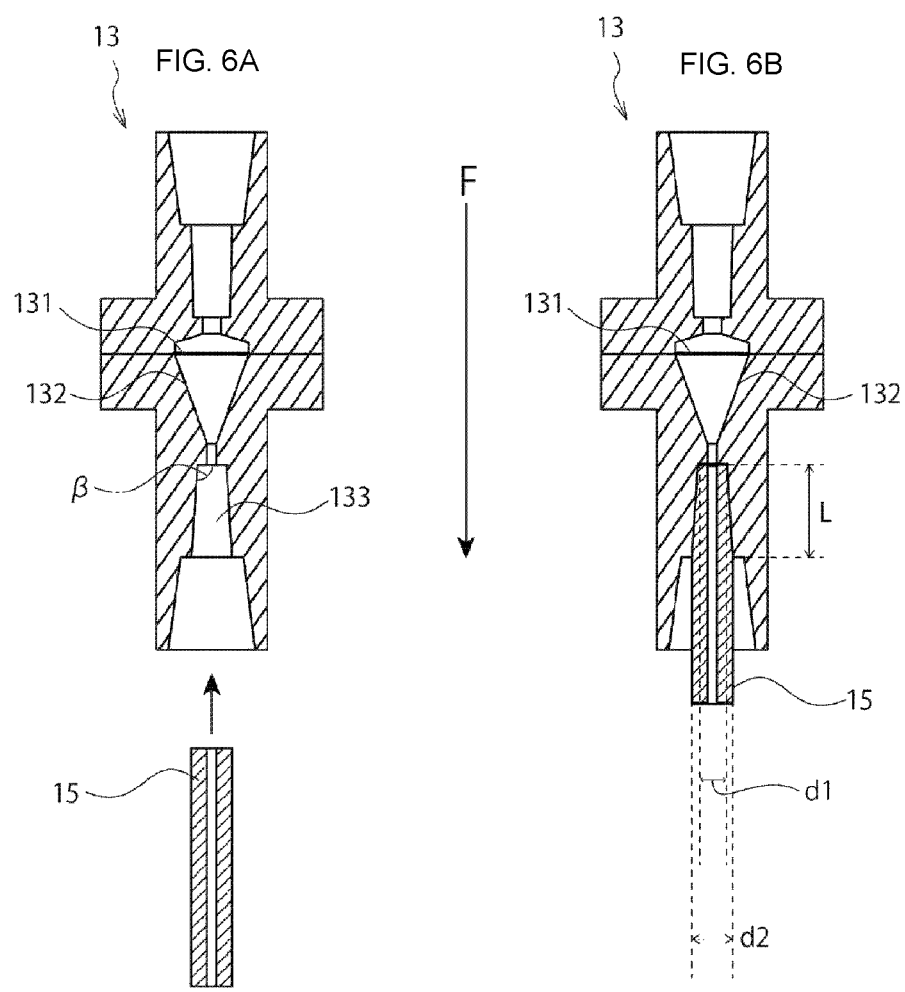
FIGS. 6A and 6B are conceptual diagrams schematically illustrating a method of connecting the filter unit 13 to a tube 15.

FIGS. 6A and 6B are conceptual diagrams illustrating a method of connecting the filter unit 13 to the tube 15. FIG. 6A is the conceptual diagram illustrating a state of the filter unit 13 and the tube 15 before connection, and FIG. 6B is the conceptual diagram illustrating a state in which the filter unit 13 is connected to the tube 15. As illustrated in FIG. 6B, the filter unit 13 may be connected to the tube 15 by pushing the tube 15 into the fitting portion 133 of the filter unit 13.

The fitting portion 133 preferably has a tapered structure in which the diameter decreases in a direction toward the filter 131. A taper angle β of the tapered structure may be designed according to a form of the tube 15 to be connected, and in the present technology, the taper angle β of the tapered structure is preferably set to 80 to 90°. By designing the taper angle β of the tapered structure within this range, even in a case where variation in outer diameter dimension of the tube 15 and variation in dimension of the fitting portion 133 slightly occur at the time of manufacturing, it is possible to reliably connect them to each other.

Furthermore, an inner diameter d1 on the filter 131 side and a length L in a longitudinal axis direction of the fitting portion 133 may be designed according to the form of the tube 15 to be used. For example, in a case where the tube 15 having an outer diameter d2 of 3.4 to 3.5 mm is used, the inner diameter d1 on the filter 131 side of the fitting portion 133 is preferably designed to be 3.3 to 3.6 mm, and the length L in the longitudinal axis direction of the fitting portion 133 is preferably designed to be 15 to 25 mm. By designing the inner diameter d1 on the filter 131 side of the fitting portion 133 and the length L in the longitudinal axis direction of the fitting portion 133 according to the form of the tube 15 to be used, it is possible to reliably connect even in a case where the variation in dimensional of the fitting portion 133 slightly occurs at the time of manufacturing.

The filter unit 13 described above may be arranged at any position as long as the effect of the present technology is not impaired; however, for example, as in the first embodiment of the particle sorting kit 1 according to the present technology illustrated in FIG. 1, by providing the same upstream of the sample accommodation unit 11, it is possible to prevent entry of foreign matters into the sample accommodation unit 11 at an initial stage.

Figure 7:
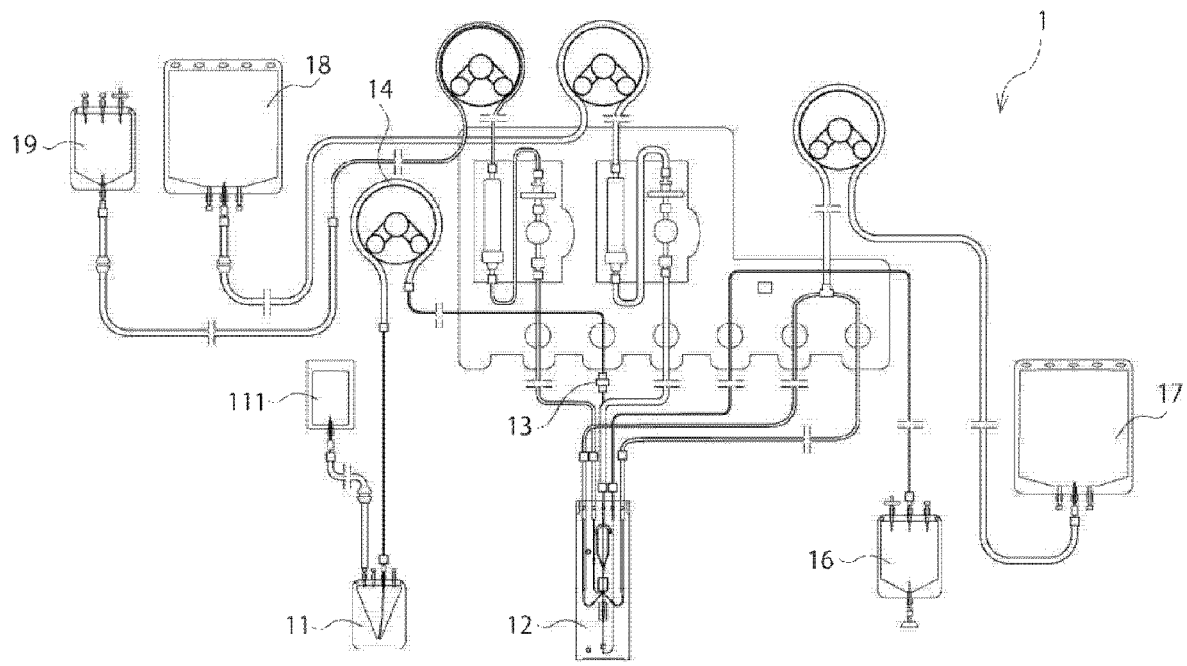
FIG. 7 is a conceptual diagram schematically illustrating a second embodiment of a particle sorting kit 1 according to the present technology.

Furthermore, for example, as in a second embodiment of the particle sorting kit 1 according to the present technology illustrated in FIG. 7, the filter unit 13 may be arranged between the sample accommodation unit 11 and the microchip 12. In this case, the filter unit 13 is preferably arranged immediately before the microchip 12. By arranging the filter unit 13 immediately before the microchip 12, it is possible to reliably prevent entry of foreign matters into the microchip 12, and as a result, it is possible to improve accuracy of analysis and sorting of the target particles performed in the microchip 12.

Figure 8:
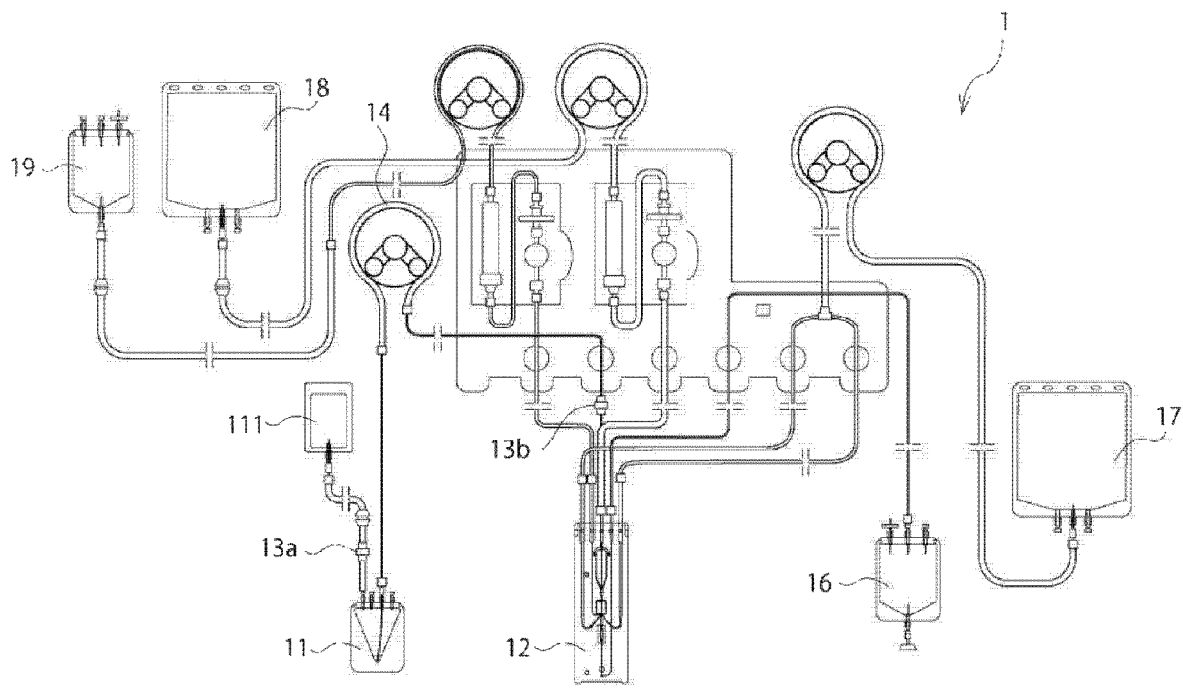
FIG. 8 is a conceptual diagram schematically illustrating a third embodiment of a particle sorting kit 1 according to the present technology.

Moreover, for example, as in a third embodiment of the particle sorting kit 1 according to the present technology illustrated in FIG. 8, filter units 13a and 13b may be arranged at two positions: upstream of the sample accommodation unit 11 and between the sample accommodation unit 11 and the microchip 12. By arranging in this manner, the filter unit 13b arranged between the sample accommodation unit 11 and the microchip 12 may remove the aggregate formed while the particles in the sample liquid flow from the sample accommodation unit 11 to the microchip 12 while the filter unit 13a arranged upstream of the sample accommodation unit 11 prevents the entry of the foreign matters into the sample accommodation unit 11 at the initial stage. As a result, it is possible to improve accuracy of analysis and sorting of the target particles performed in the microchip 12.

(4) Tube Pump Unit 14

The filter unit 13 of the particle sorting kit 1 according to the present technology may be provided with the tube pump unit 14. In the particle sorting kit 1 according to the present technology, the tube pump unit 14 may be formed by using an elastic material. Note that, a roller for squeezing an elastic tube may be provided on the particle sorting kit 1 according to the present technology, but it is also possible to allow the sample liquid in the tube 15 to flow by installing the tube pump unit 14 of the particle sorting kit 1 according to the present technology in a roller portion provided on a particle sorting device 2 side to be described later.

In the particle sorting kit 1 according to the present technology, the tube pump unit 14 may be arranged at any position as long as the effect of the present invention is not impaired; however, as in the second embodiment of the particle sorting kit 1 according to the present technology illustrated in FIG. 7 and the third embodiment of the particle sorting kit 1 according to the present technology illustrated in FIG. 8, it is preferable to arrange the same between the filter unit 13 (13b) provided between the sample accommodation unit 11 and the microchip 12 and the sample accommodation unit 11. In the tube pump unit 14, the particles in the sample liquid are likely to aggregate, so that by arranging in this manner, even in a case where the aggregate of the particles is formed while flowing through the tube pump unit 14, the formed aggregate may be removed by the filter unit 13 (13b) before the microchip 12. As a result, it is possible to improve accuracy of analysis and sorting of the target particles performed in the microchip 12.

(5) Target Particle Storage Unit 16

The particle sorting kit 1 according to the present technology may be provided with the target particle storage unit 16 as necessary. The target particle storage unit 16 accommodates the sorted target particles. The target particle storage unit 16 is formed into, for example, a bag shape in which the target particles are accommodated, and is provided with an opening valve connected to the sorting flow path 122 of the microchip 12. The opening valve employs a configuration of a so-called check valve, and in a state in which the target particles are accommodated in the target particle storage unit 16 via the opening valve, the target particles do not go out of the target particle storage unit 16. Furthermore, the configuration of the opening valve prevents the target particles from coming into contact with the external atmosphere.

The configuration of the target particle storage unit 16 described above is merely an example, and a known configuration may be employed as long as the target particles do not come into contact with the external atmosphere.

(6) Disposal Unit 17

In the particle sorting kit 1 according to the present technology, when only the target particles are sorted from the sample liquid in the microchip 12, it is necessary to exclude the non-target particles. Furthermore, since the sheath flow is formed to sort the target particles in the microchip 12, it is necessary to exclude the sample liquid containing the non-target particles. Therefore, the particle sorting kit 1 according to the present technology may be provided with the disposal unit 17 as necessary. The particles other than the target particles are disposed in the disposal unit 17.

(7) Sheath Liquid Accommodation Unit 18

In the particle sorting kit 1 according to the present technology, the sheath flow is formed, and the target particles are sorted from the sample liquid in the microchip 12. Therefore, the particle sorting kit 1 according to the present technology may be provided with the sheath liquid accommodation unit 18 as necessary. The sheath liquid is accommodated in the sheath liquid accommodation unit 18.

The sheath liquid accommodation unit 18 is provided with, for example, a tubular member into which the sheath liquid flows, and the tubular member communicates with the sheath inlet 1231 of the microchip 12. As a result, the sheath liquid flows into the flow path of the microchip 12, and the sheath flow is formed.

The configuration of the sheath liquid accommodation unit 18 is not especially limited, and a known configuration may be employed. Furthermore, the configuration for discharging the sheath liquid from the sheath liquid accommodation unit 18 is not especially limited, and for example, a drive source such as an actuator may be used.

(8) Gate Liquid Accommodation Unit 19

Furthermore, the particle sorting kit 1 according to the present technology may be provided with the gate liquid accommodation unit 19 as necessary. The gate liquid is accommodated in the gate liquid accommodation unit 19. Since the "gate liquid" is similar to that described above, this is not herein described.

The gate liquid accommodation unit 19 is provided with, for example, a tubular member into which the gate liquid flows, and the tubular member communicates with the gate liquid inlet 1271 of the microchip 12. As a result, the gate liquid flows into the flow path of the microchip 12, and the target particles are sorted.

The configuration of the gate liquid accommodation unit 19 is not especially limited, and a known configuration may be employed. Furthermore, the configuration for discharging the gate liquid from the gate liquid accommodation unit 19 is not especially limited, and for example, a drive source such as an actuator may be used.

A part or all of respective parts of the particle sorting kit 1 according to the present technology described above may be hermetically connected. Therefore, the sorting of the target particles and the storage of the target particles may be executed in a sealed space, so that a purification degree of the sorting of the target particles may be improved. Furthermore, it is possible to prevent contamination of the particle sorting kit itself by mist containing the target particles and/or mixture of other substances into the sorted target particles.

As a result, the particle sorting kit 1 according to the present technology may also be applied to clinical applications such as immune cell therapy requiring purity of target particles.

Furthermore, the particle sorting kit 1 itself according to the present technology may be made disposable, thereby avoiding a risk of contamination between samples and the like to improve usability.

Moreover, each unit of the particle sorting kit 1 according to the present technology may be plural. For example, although not illustrated, by further providing the microchip 12 downstream of the target particle storage unit 16, the target particles sorted from the sample liquid may be sorted more finely.

2. Particle Sorting Device 2 and Particle Measurement System 3

Figure 9:
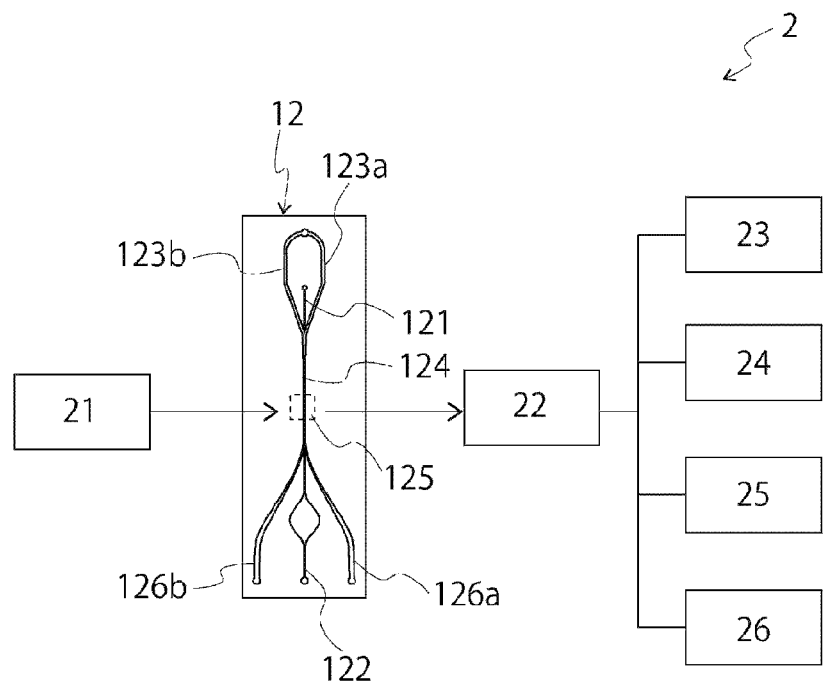
FIG. 9 is a conceptual diagram schematically illustrating an example of an embodiment of a particle sorting device 2 according to the present technology.
Figure 10:
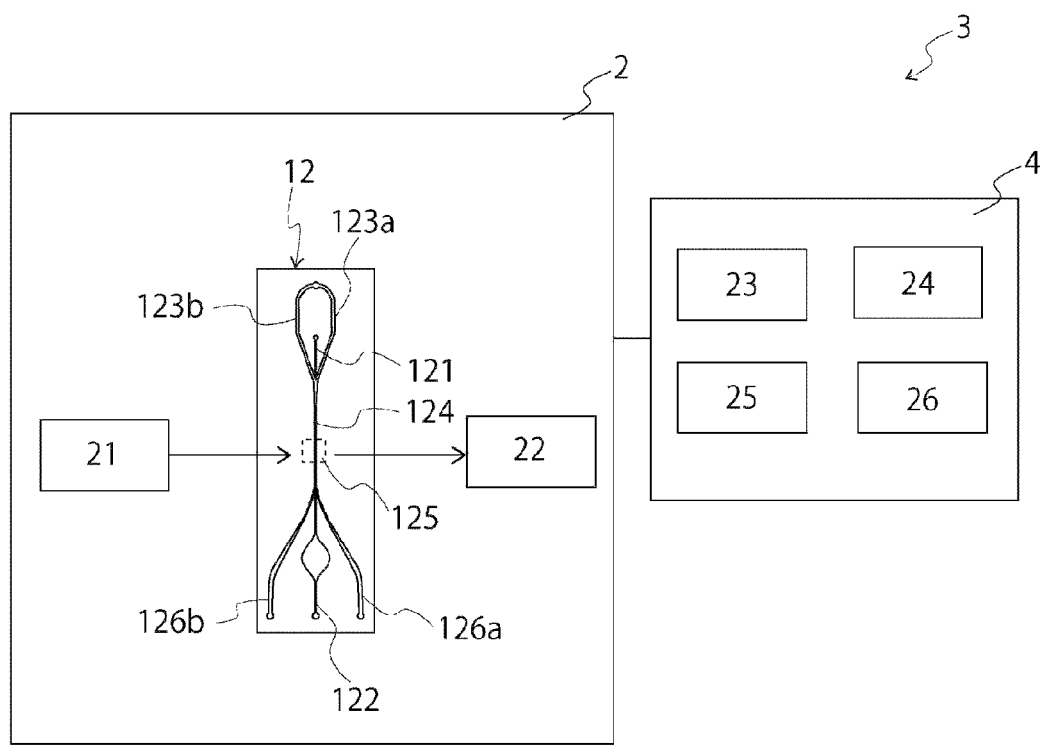
FIG. 10 is a conceptual diagram schematically illustrating an example of an embodiment of a particle sorting system 3 according to the present technology.
Figure 11:
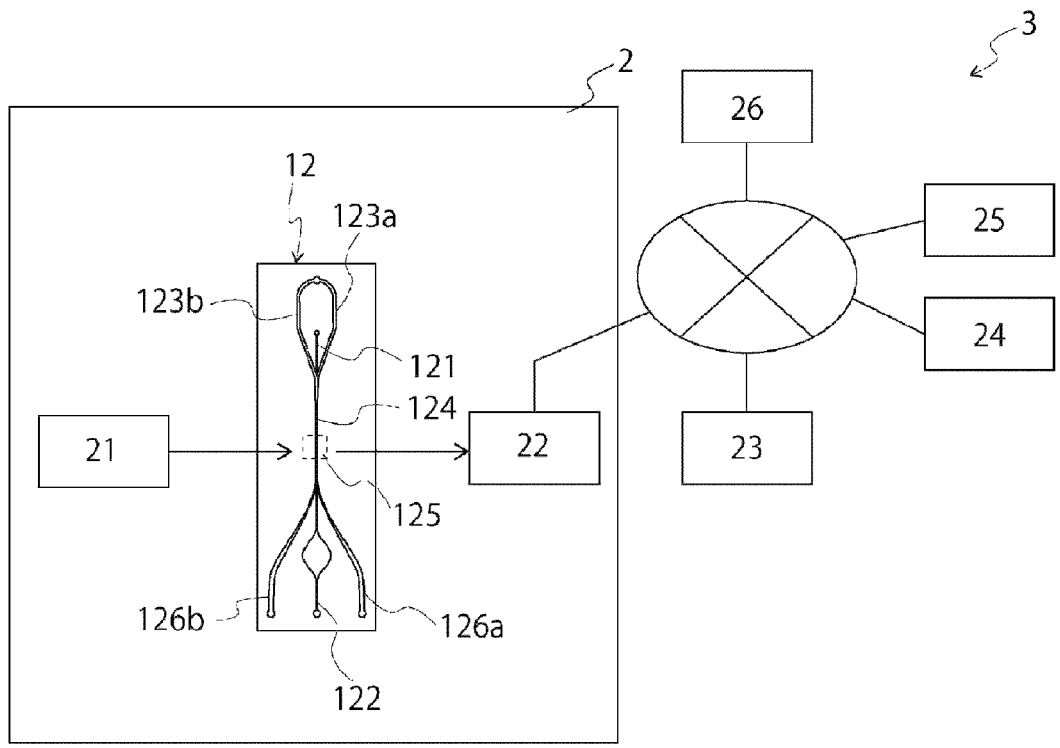
FIG. 11 is a conceptual diagram schematically illustrating an example different from FIG. 10 of the embodiment of the particle sorting system 3 according to the present technology.

FIG. 9 is a conceptual diagram schematically illustrating an example of an embodiment of a particle sorting device 2 according to the present technology. FIGS. 10 and 11 are conceptual diagrams schematically illustrating an example of an embodiment of a particle sorting system 3 according to the present technology. Note that, in FIGS. 9 to 11, for convenience of space, only the portion of the microchip 12 is illustrated in the particle sorting kit 1 according to the present technology.

The particle sorting device 2 and the particle sorting system 3 according to the present technology are at least provided with the particle sorting kit 1 according to the present technology described above, the light irradiation unit 21, and the light detection unit 22. Furthermore, an information processing unit 23, a storage unit 24, a display unit 25, a user interface 26 and the like may also be provided as necessary.

Note that, the information processing unit 23, the storage unit 24, the display unit 25, the user interface 26 and the like may be provided in the particle sorting device 2 as illustrated in FIG. 9, or the particle measurement system 3 including an information processing device 4 provided with the information processing unit 23, the storage unit 24, the display unit 25, and the user interface 26, and the particle sorting device 2 may be made as illustrated in FIG. 10. Furthermore, as illustrated in FIG. 11, the particle measurement system 3 obtained by connecting the information processing unit 23, the storage unit 24, the display unit 25, and the user interface 26 independent from one another to the light detection unit 22 of the particle sorting device 2 via a network may be made.

Moreover, the information processing unit 23, the storage unit 24, and the display unit 25 may be provided in a cloud environment and connected to the particle sorting device 2 via a network. In this case, a record of information processing in the information processing unit 23 and the like may be stored in the storage unit 24, and various types of information stored in the storage unit 24 may be shared by a plurality of users.

(1) Particle Sorting Kit 1

The particle sorting device 2 is provided with the particle sorting kit 1 that performs sorting, storage and the like of the target particles. The particle sorting kit 1 is provided with the microchip 12. Note that, since the particle sorting kit 1 is similar to that described above, this is not herein described.

(2) Light Irradiation Unit 21

The light irradiation unit 21 irradiates the sample to be sorted with light. Specifically, the light irradiation unit 21 irradiates the particles flowing through the detection area 125 provided on the main flow path 124 of the microchip 12 with light (excitation light).

The light irradiation unit 21 includes, for example, a light source that emits the excitation light, an objective lens that condenses the excitation light on the sample liquid that flows through the main flow path 124 and the like. The light source may be appropriately selected from a laser diode, a SHG laser, a solid-state laser, a gas laser, a high-luminance LED and the like according to a purpose of analysis to be used. Furthermore, the light irradiation unit 21 may include optical elements other than the light source and the object lens as necessary.

(3) Light Detection Unit 22

The light detection unit 22 detects fluorescence and scattered light emitted from a sorting target sample irradiated with the excitation light. Specifically, the light detection unit 22 detects the fluorescence and scattered light emitted from the sample and converts the same into an electric signal. Then, the electric signal is output to the information processing unit 23 to be described later.

The configuration of the light detection unit 22 is not especially limited, and a known configuration may be employed, and further, a method of converting into the electric signal is not especially limited.

(4) Information Processing Unit 23

The electric signal converted by the light detection unit 22 is input to the information processing unit 23. Specifically, the information processing unit 23 determines the optical characteristics of the sample liquid and the target particles contained in the sample liquid on the basis of the input electric signal.

Moreover, the information processing unit 23 is provided with a gating circuit for calculating a threshold for sorting the target particles from the sample liquid, a threshold for determining whether or not the target particles of the requested number or more are sorted and the like. In a case where the threshold for sorting the target particles from the sample liquid is calculated by the configuration of the gating circuit, this is converted into the electric signal for sorting, and the sorting signal is output to the piezoelectric element provided on the microchip 12.

Note that, the configuration of the information processing unit 23 is not especially limited, and a known configuration may be employed. Moreover, a known method may also be employed as an information processing method performed by the gating circuit of the information processing unit 23.

(5) Storage Unit 24

The particle sorting device 2 and the particle sorting system 3 according to the present technology may further be provided with the storage unit 24 in which various data are stored. The storage unit 24 may store, for example, all items regarding measurement such as optical information of the particles detected by the light detection unit 22, the record of the information processing in the information processing unit 23 and the like.

Furthermore, as described above, in the present technology, since the storage unit 24 may be provided in the cloud environment, it is also possible for each user to share the various types of information recorded in the storage unit 24 on the cloud via a network.

Note that, in the present technology, the storage unit 24 is not indispensable, and it is also possible to store the various data using an external storage device and the like.

(6) Display Unit 25

The particle sorting device 2 and the particle sorting system 3 according to the present technology may further be provided with the display unit 25 that displays various types of information. The display unit 25 may display all items regarding measurement such as, for example, optical information of the particles detected by the light detection unit 22, various data subjected to information processing by the information processing unit 23 and the like.

In the present technology, the display unit 25 is not indispensable, and an external display device may also be connected. As the display unit 25, for example, a display, a printer and the like may be used.

(7) User Interface 26

The particle sorting device 2 and the particle sorting system 3 according to the present technology may further be provided with the user interface 26 that is a part operated by the user. The user may access each unit through the user interface 26 to control each unit.

In the present technology, the user interface 26 is not indispensable, and an external operating device may also be connected. As the user interface 26, for example, a mouse, a keyboard and the like may be used.

Note that, the present technology may also take the following configuration.

(1) A particle sorting kit provided with:
- a sample accommodation unit configured to accommodate a sample liquid containing particles;
- a microchip provided with a sample flow path through which the sample liquid flows and a sorting flow path in which target particles are sorted from the sample liquid; and
- a filter unit provided with a filter and a tapered portion that decreases a flow path diameter in a flow direction downstream of the filter.

(2) The particle sorting kit according to (1), in which a taper angle of the tapered portion is 50 to 80°.

(3) The particle sorting kit according to (1) or (2), in which the sample accommodation unit, the microchip, and the filter unit are hermetically connected.

(4) The particle sorting kit according to any one of (1) to (3), in which the filter unit is provided upstream of the sample accommodation unit.

(5) The particle sorting kit according to any one of (1) to (4), in which the filter unit is provided between the sample accommodation unit and the microchip.

(6) The particle sorting kit according to any one of (1) to (5), in which the filter unit is provided upstream of the sample accommodation unit and between the sample accommodation unit and the microchip.

(7) The particle sorting kit according to (5) or (6), in which a tube pump unit is provided between the sample accommodation unit and the filter unit.

(8) The particle sorting kit according to any one of (1) to (7), in which the filter unit is provided with a fitting portion for fitting to an outer diameter of a tube for connection to the sample accommodation unit and/or the microchip.

(9) The particle sorting kit according to (8), in which the fitting portion has a tapered structure in which a diameter decreases in a direction toward the filter.

(10) The particle sorting kit according to (9), in which a taper angle of the tapered structure of the fitting portion is 80 to 90°.

REFERENCE SIGNS LIST

1 Particle sorting kit
11 Sample accommodation unit
12 Microchip
13 Filter unit
14 Tube pump unit
15 Tube
16 Target particle storage unit 17 Disposal unit
18 Sheath liquid accommodation unit
19 Gate liquid accommodation unit
2 Particle sorting device
3 Particle sorting system
21 Light irradiation unit
22 Light detection unit
23 Information processing unit
24 Storage unit
25 Display unit
26 User interface

The invention claimed is:

1. A particle sorting kit, comprising:
a sample accommodation unit configured to accommodate a sample liquid containing particles;
a microchip with that comprises:
  a sample flow path through which the sample liquid flows; and
  a sorting flow path in which target particles are sorted from the sample liquid; and
a filter unit that comprises:
  a filter; and
  a tapered portion that decreases a flow path diameter in a flow direction downstream of the filter,
    wherein the sample accommodation unit, the microchip, and the filter unit are hermetically connected.

2. The particle sorting kit according to claim 1, wherein a taper angle of the tapered portion is 50 to 80°.

3. The particle sorting kit according to claim 1, wherein the filter unit is in upstream of the sample accommodation unit.

4. The particle sorting kit according to claim 1, wherein the filter unit is between the sample accommodation unit and the microchip.

5. The particle sorting kit according to claim 1, wherein the filter unit is in upstream of the sample accommodation unit and between the sample accommodation unit and the microchip.

6. The particle sorting kit according to claim 4, further comprising a tube pump unit between the sample accommodation unit and the filter unit.

7. The particle sorting kit according to claim 1, wherein the filter unit comprises a fitting portion, and
the fitting portion fits to an outer diameter of a tube for connection to one of the sample accommodation unit or the microchip.

8. The particle sorting kit according to claim 7, wherein the fitting portion has a tapered structure in which a diameter decreases in a direction toward the filter.

9. The particle sorting kit according to claim 8, wherein a taper angle of the tapered structure of the fitting portion is 80 to 90°.

* * * * *